(12) United States Patent
Apreutesei et al.

(10) Patent No.: US 11,032,108 B2
(45) Date of Patent: Jun. 8, 2021

(54) FACILITATING PERSONAS IN COMMUNICATION EXCHANGE ENVIRONMENTS

(71) Applicant: Microsoft Corporation, Redmond, WA (US)

(72) Inventors: Elena Apreutesei, Redmond, WA (US); Michael R. TenEyck, Seattle, WA (US); Michael K. Higashi, Issaquah, WA (US); Gustavo Santos, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 872 days.

(21) Appl. No.: 13/705,515

(22) Filed: Dec. 5, 2012

(65) Prior Publication Data
US 2014/0156644 A1 Jun. 5, 2014

(51) Int. Cl.
*G06F 16/48* (2019.01)
*H04L 12/64* (2006.01)
*G06F 16/14* (2019.01)

(52) U.S. Cl.
CPC ........ *H04L 12/6418* (2013.01); *G06F 16/156* (2019.01); *G06F 16/48* (2019.01)

(58) Field of Classification Search
CPC ......... G06F 17/30867; G06F 17/30864; G06F 17/30991; G06F 16/14; G06F 16/156
USPC .................................................. 707/722, 758
See application file for complete search history.

(56) References Cited

U.S. PATENT DOCUMENTS

| | | | |
|---|---|---|---|
| 6,671,682 B1* | 12/2003 | Nolte et al. | |
| 7,890,581 B2* | 2/2011 | Rao et al. | 709/204 |
| 8,234,346 B2* | 7/2012 | Rao et al. | 709/207 |
| 8,244,851 B1* | 8/2012 | Postoaca | 709/223 |
| 2008/0133716 A1* | 6/2008 | Rao et al. | 709/220 |
| 2010/0100398 A1* | 4/2010 | Auker et al. | 705/4 |
| 2011/0161279 A1* | 6/2011 | Rao et al. | 706/52 |
| 2012/0033610 A1* | 2/2012 | Ring et al. | 370/328 |
| 2012/0290659 A1* | 11/2012 | Rao et al. | 709/204 |
| 2013/0097529 A1* | 4/2013 | Postoaca | 715/753 |
| 2013/0311590 A1* | 11/2013 | Chagnon | 709/206 |

\* cited by examiner

*Primary Examiner* — Joshua Bullock

(57) ABSTRACT

Methods, systems, and software are disclosed herein for facilitating personas in communication exchange environments. Aspects of the disclosure include search requests to search for relevant personas. In response to each of the search requests, different contact sources are searched for any relevant contacts. Any relevant personas can then be returned having contact information assembled from the relevant contacts.

19 Claims, 6 Drawing Sheets

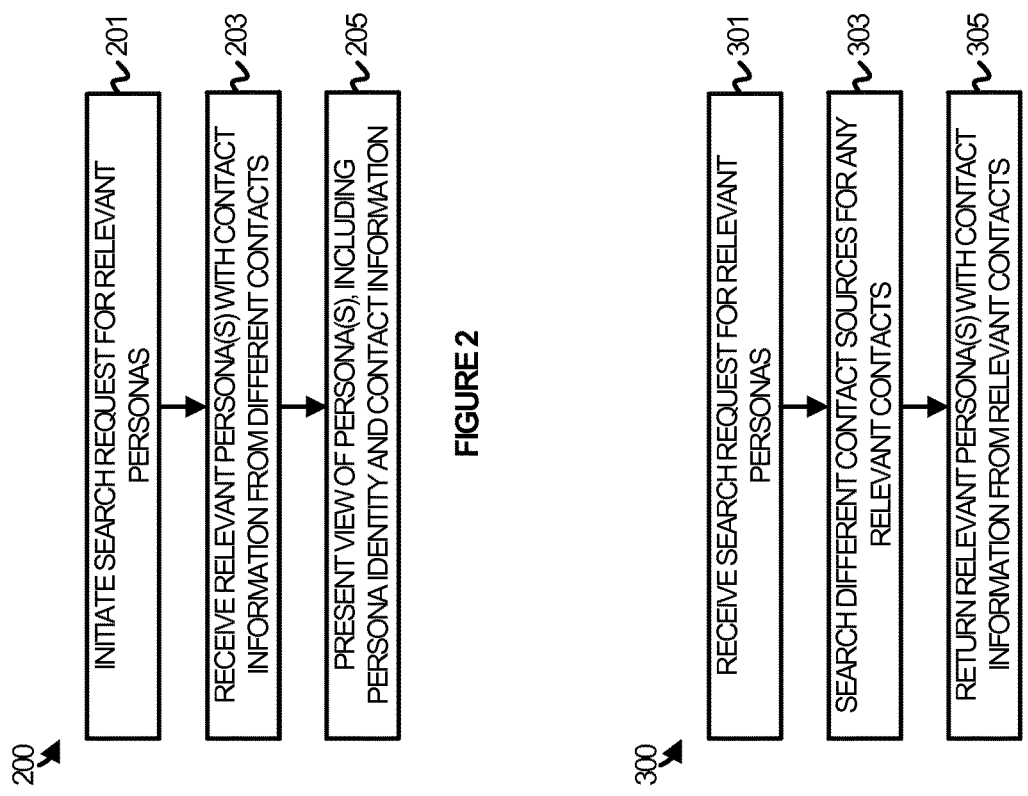
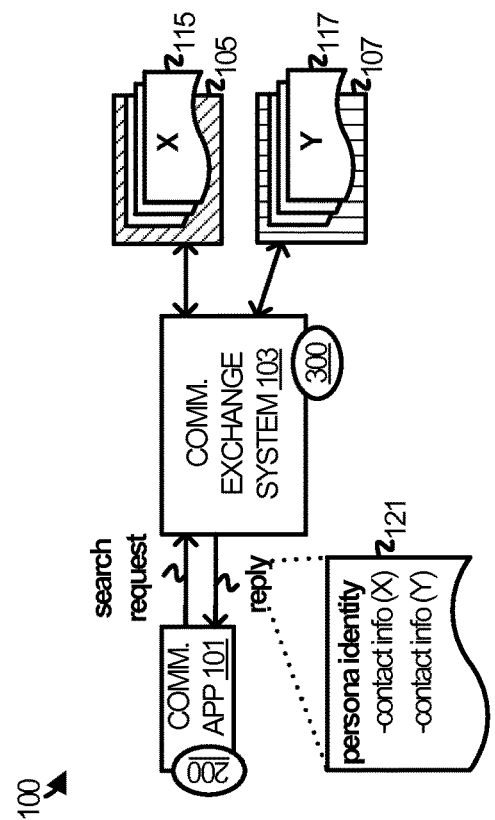

FACILITATING PERSONAS IN COMMUNICATION EXCHANGE ENVIRONMENTS

TECHNICAL FIELD

Aspects of the disclosure are related to computing and communication technology, and in particular, to personas in communication exchange environments.

TECHNICAL BACKGROUND

Many communication applications provide contact-related tools that allow users to search for people in their contacts, initiate communications from their contacts, manage their contacts, and the like. It is becoming increasingly common to store contacts in more than one location, such as on a phone, tablet, laptop, or personal computer, as well as on a social networking site, a hosted contacts folder, or within an organization's directory service. As a result, some tools are configured to access multiple contact sources when providing a feature or function to a user.

For example, some search tools allow users to perform a search of their contacts for a particular person or people represented in the contacts. Such a search tool may communicate with multiple contact sources to identify and retrieve contacts relevant to the search. The relevant contacts can then be presented to the user, from which other functions or features may be initiated. For instance, it may be possible to launch an email, voice or video call, or instant messaging session from within a contact.

One implication associated with multiple contact sources is that a single person may be represented by multiple contacts stored in various ones of the multiple contact sources. As a result, a search for a person or people may result in the presentation of multiple contacts associated with a single person. For example, a user may initiate a search for a particular person or people, the results of which are drawn from both the contact folder associated with the user and the organization directory associated with the user.

OVERVIEW

Provided herein are systems, methods, and software for facilitating personas in communication exchange environments. In at least one implementation, a communication exchange system receives search requests to search for relevant personas initiated by application platforms in a communication exchange environment. The communication exchange system, in response to each of the plurality of search requests, searches different contact sources for any relevant contacts and returns any relevant personas to the application platforms. Each of the relevant personas includes contact information assembled from the relevant contacts.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a communication exchange environment in an implementation.

FIG. 2 illustrates a persona process employed by a communication application in an implementation.

FIG. 3 illustrates a persona process employed by a communication exchange system in an implementation.

TECHNICAL DISCLOSURE

Figure 4:
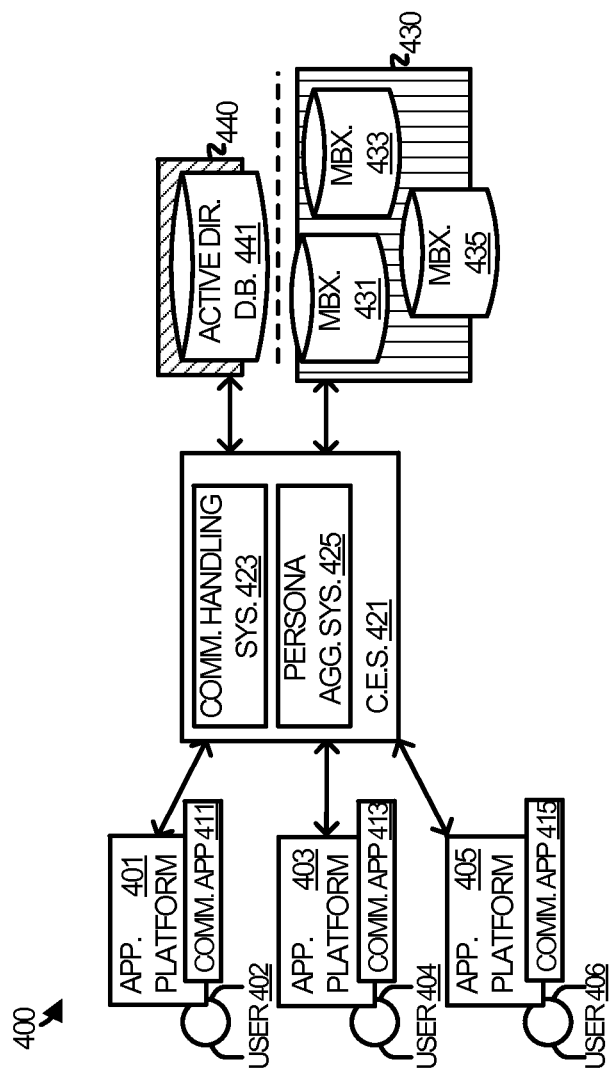
FIG. 4 illustrates a communication exchange environment in an implementation.

Implementations described herein provide for facilitating personas in communication exchange environments. A persona is an aggregation of contact information assembled from multiple contacts, yet presented under a single persona identity. In many cases, a persona may include contact information assembled from different contacts stored in different contact sources, yet presented using a single persona identity. Personas allow contact information assembled from different contacts, but associated with the same person, to be displayed in a more organized and effective manner.

In at least one implementation, a communication exchange system functions to handle search requests initiated by application platforms on which communication applications run. In to a given search request that includes search criteria with which to search for relevant personas, the communication exchange system identifies persona identities that may be relevant based on the search criteria. For example, persona names or alias are identified based on the search criteria.

In response to identifying the persona identities, the communication exchange system searches or otherwise communicates with different contact sources to identify contacts associated with the persona identities. Personas are generated using contact information assembled from the contacts and the communication exchange system replies with the relevant personas. In some scenarios, only a subset of the contact information contained in each contact is used to populate the personas. The search request may include reply criteria that specifies with which subset of contact information to populate the relevant personas. Thus, the contact information may be assembled based on the reply criteria.

The communication exchange system may be capable of interfacing with a variety of contact sources to identify relevant contacts and assembled contact information. In various scenarios, the contact sources may include contacts folders, organization directories, social networking sites, or any other type of contact source, combination of sources, or variations thereof. It may be appreciated that the contact sources may vary and are not limited to just those disclosed herein. Because contacts may reside in a variety of contact sources and because their corresponding contact information may change at any time, in some implementations personas are generated only upon the occurrence of a search request. Such implementations may provide an effective way to ensure that any relevant personas include up to date and relevant contact information.

Referring now to the drawings, FIG. 1 illustrates communication exchange environment 100 in an implementation. Communication exchange environment 100 includes communication application 101 coupled communicatively with communication exchange system 103. Communication exchange environment 100 also includes contact source 105 and contact source 107, which may be communicatively coupled with communication exchange system 103 or even integrated therein. Among other features and functions, in operation, communication application 101 may perform persona process 200 as described in detail below with respect to FIG. 2. Communication exchange system 103 may perform persona process 300 as described below with respect to FIG. 3.

Communication application 101 may be any application capable of interfacing with communication exchange system 103 to engage with a communication service provided at least in part by communication exchange system 103. Examples of communication application 101 include email clients, unified communication applications, instant messaging or chat applications, micro-blogging applications, telephony applications, as well as any other type of communication application. Communication application 101 may be provisioned and delivered in a variety of ways. For example, communication application 101 may be a stand-alone application but may also be integrated within other applications. Communication application 101 may be locally installed and executed, hosted by an application server, or streamed by an application server, or provisioned and delivered in any other suitable manner by any suitable computing system. Examples of suitable computing systems include application servers, personal computers, laptop computers, tablet computers, notebook computers, mobile phones, and gaming systems, as well as any other suitable system, combination of systems, or variations thereof.

Communication exchange system 103 may be any system, sub-system, or collection of systems or sub-systems capable of providing a communication service to communication applications. Examples of communication exchange system 103 include email, unified communications, instant messaging, and telephony systems and sub-systems. Communication exchange system 103 may be capable of interfacing with communication application 101 to facilitate communication services on behalf of a user engaged with communication application 101 and other users engaged with the communication services. For example, communication exchange system 103 may be capable interfacing with communication application 101 to handle emails, phone calls, video sessions, or chat sessions, or other kinds of communications.

Communication exchange environment 100 also includes contact source 105 and contact source 107. Contact sources 105 and 107 are representative of any system, data structure, database, or other suitable source in which contacts may be stored. The contacts stored in contact source 105 and contact source 107, represented by contact 115 and contact 117 respectively, may be any collection of information organized as contacts, at least a portion of which may be used by communication application 101 to initiate or otherwise engage with aspects of any communication service provided by communication exchange system 103. For example, contact 115 and contact 117 may include a variety of contact information, such as the name of a person, phone numbers, email addresses, service handles, physical address information, or any other suitable contact information.

FIG. 2 illustrates persona process 200 that may be employed by communication application 101 in an implementation. The following discussion of persona process 200 will proceed with reference to communication exchange environment 100 for exemplary purposes, although it may be appreciated that persona process 200 could be implemented in a variety of other environments.

To begin, communication application 101 initiates a search request having search criteria with which to search for any contacts in contact source 105 and contact source 107 that could be used to generate personas (step 201). The search request is communicated to communication exchange system 103, in response to which relevant personas are received by communication application 101 (step 203). At least one of the relevant personas may include contact information assembled from contacts in contact source 105 and contact source 107. Others of the personas may or may not include contact information from both contact source 105 and contact source 107. Communication application 101 may then initiate presentation of a view of the personas (step 205). The view may include at least a portion of the contact information associated with each of the personas.

Communication exchange system 103 may perform a corresponding persona process 300, illustrated in FIG. 3, to facilitate the identification and delivery of relevant personas to communication application 101. The following discussion of persona process 300 will proceed with reference to communication exchange environment 100 for exemplary purposes, although it may be appreciated that persona process 300 could be implemented in a variety of other environments.

To begin, communication exchange system 103 receives the search request for relevant personas initiated by communication application 101 (step 301). In response to the search request, communication exchange system 103 searches contact source 105 and contact source 107 for any contacts relevant to the search criteria in the search request (step 303). Communication exchange system 103 may optionally identify persona identities based on the search criteria in response to the search request. Communication exchange system 103 may also identify the contact sources that are associated with the identified persona identities. Upon identifying the relevant contacts, communication exchange system 103 returns any relevant personas to communication application 101 for presentation to a user (step 305). The personas may include contact information assembled from contacts in contact source 105 and contact source 107.

Persona 121 is illustrated in FIG. 1 to provide one example of a persona that may be returned to communication application 101 by communication exchange system 103. Persona 121 includes contact information assembled from contact 115 in contact source 105 and contact information assembled from contact 117 in contact source 107. Persona 121 also includes a persona identity, such as a name, alias, or any other suitable identity. The contact information may include information by which a communication may be initiated with a persona associated with the persona identity. For instance, an email, instant chat, video session, or phone call may be launched or otherwise initiated using at least a portion of the contact information provided in persona 121.

FIG. 4 illustrates communication exchange environment 400 in an implementation. Communication exchange environment 400 includes application platform 401, application platform 403, and application platform 403 associated with user 402, user 404, and user 406 respectively. Users 402, 404, and 406 may interact with communication applications 411, 413, and 415 accessible by way of application platforms 401, 403, and 405 respectively. Communication applications 411, 413, and 415 communicate with communication exchange system 421 to provide a communication service or services to users 402, 404, and 406.

Communication applications 411, 413, and 415 may be any applications capable of interfacing with communication exchange system 421 to engage with a communication service provided at least in part by communication exchange system 421. Examples of communication applications 411, 413, and 415 include email clients, unified communication applications, instant messaging or chat applications, microblogging applications, or telephony applications, as well as any other type of communication application. Communication applications 411, 413, and 415 may each be provisioned and delivered in a variety of ways. For example, they may each be a stand-alone application but may also be integrated within other applications. Communication applications 411, 413, and 415 may each be locally installed and executed, hosted by an application server, or streamed by an application server, or provisioned and delivered in any other suitable manner by any suitable computing system. Examples of suitable computing systems include application servers, personal computers, laptop computers, tablet computers, notebook computers, mobile phones, and gaming systems, as well as any other suitable system, combination of systems, or variations thereof.

Communication exchange system 421 includes communication handling system 423 and persona aggregation system 425. Overall, communication exchange system 421 may be any system capable of providing a communication service or services to communication applications 411, 413, 415. Examples of communication handling system 423 include email, unified communications, instant messaging, and telephony systems and sub-systems. Communication handling system 423 may be any sub-system or collection of sub-systems capable of providing aspects of the communication service or services when engaged with communication applications 411, 413, and 415. Persona aggregation system 425 may be any system or collection of systems or sub-systems capable of providing a persona service to communication applications 411, 413, and 415. Communication exchange system 421 may include other elements or features not illustrated herein for purposes of brevity and clarity.

For example, persona aggregation system 425 may interface with communication applications 411, 413, and 415 to generate relevant personas to users 402, 404, and 406, from which communications may be initiated. Upon initiating the communications, communication handling system 423 may interface with communication applications 411, 413, and 415 to facilitate communication services on behalf of users 402, 404, and 406, such as by sending or receiving emails, establishing voice or video calls, handling instant messaging communications, and the like As part of providing the persona service to communication applications 411, 413, and 415, persona aggregation system 425 is operatively coupled to or otherwise in communication with contact source 430 and contact source 440. Contact source 430 includes mailbox (MBX.) 431, mailbox (MBX.) 433, and mailbox (MBX.) 435, while contact source 440 includes active directory (DIR.) database (D.B.) 441. Contact sources 430 and 440 may include other elements, such as other mailboxes or databases, and need not be limited to just those elements disclosed herein. In addition, the mailboxes may include other data structures or sub-structures, such as contacts folders, that store contacts and contact information.

For illustrative purposes, it is assumed that mailbox 431 is associated with user 402, mailbox 433 is associated with user 404, and mailbox 435 is associated with user 406. As such, mailbox 431 is accessed by persona aggregation system 425 in support of providing the persona service to communication application 411 and possibly communication handling system 423 in support of other aspects of a communication service, and so on with respect to mailbox 433, and mailbox 435. It is also assumed for illustrative purposes that each user is also associated with active directory database 441.

Each of the mailboxes 431, 433, and 435 includes contacts used by communication applications 411, 413, and 415. The contacts may be stored in contact folders or other data structures that can be accessed to extract contact information. The contacts may store a variety of contact information, such as names, email address, phone numbers, job titles, work places, and other suitable information about people associated with users 402, 404, and 405. Active directory database 441 also includes contacts having a variety of contact information stored therein. Persona aggregation system 425 functions to aggregate information assembled from contacts in both contact sources 430 and 440 into personas. The personas can then be communicated to communication applications 411, 413, and 415 and presented accordingly to users 402, 404, and 406. In this manner, a more efficient and effective display of information with which to contact other users is accomplished.

Figure 5:
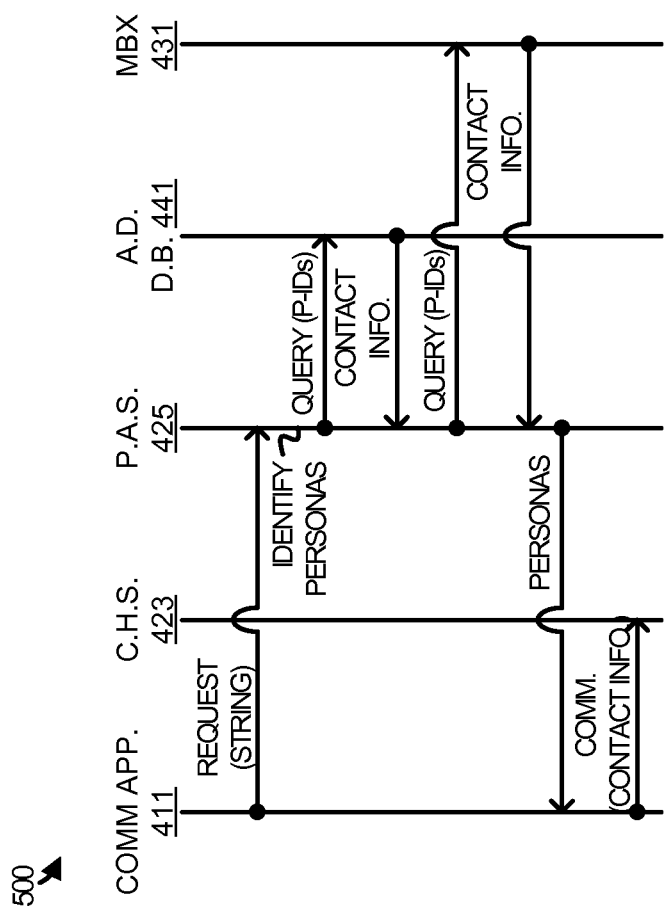
FIG. 5 illustrates an operational scenario with respect to a communication exchange environment in an implementation.

FIG. 5 illustrates one particular operational scenario 500 in an implementation to illustrate some functions and features of the persona service provided by persona aggregation system 425. In operational scenario 500, user 402 may interact with communication application 411 by way of a user interface provided by application platform 401. This interaction, achieved by way of a touch gesture, mouse click, or some other user input, may trigger or otherwise lead to the initiation of a search request to obtain relevant personas from persona aggregation system 425. In response to the user input, communication application 411 initiates the request, which may include a search string or some other information with which to search for relevant personas.

In some cases, the search string may have been generated in part by characters entered by user 402 when interacting with communication application 411. For example, the characters may have been entered via a people search tool provided by communication application 411. In another example, the characters may have been entered during the course of creating an email, making a voice or video call, or initiating an instant communication. In The search string may be a partial string, such as the first few letters of a possible name, but the search string may also represent a complete name. The search string may include a single word, multiple words, partial words, numbers, symbols, or any other possible combination or variation of alphanumeric characters.

Persona aggregation system 425 receives the search request initiated by communication application 411 and responsively attempts to identify personas relevant to the search string. This may be accomplished, for example, by referring to a list of persona names, aliases, or other identities stored in a database or some other data structure accessible to persona aggregation system 425 against which the search string may be compared or otherwise evaluated. Such a list may be constructed and maintained in a variety of ways that need not be discussed herein. However, some scenarios may involve examining contacts in different contact sources to identify those that may be aggregated into a single persona. Those contacts can then be assigned a persona identifier, such as the persona identifiers found in table 427 or table 428 (referring to FIGS. 6 and 7). Contacts may be selected for aggregation based on, for example, the nature or character of names, phone numbers, email addresses, service handles, or other contact information stored in each contact. A variety of ways in which contacts may be linked or otherwise noted for aggregation may exist and are not be limited to just those techniques disclosed herein.

Persona aggregation system 425 then queries both active directory database 441 and mailbox 431 with persona identifiers associated with any relevant personas identities. The persona identifiers may be identified from the same list of persona identities or may be determined in some other manner. In any case, the persona identifiers are used to identify associated contacts in active directory database 441 and mailbox 431, from which contact information can be assembled for the previously identified persona identities relevant to the search string.

In this example, it is assumed that active directory database 441 and mailbox 431 each include at least one contact relevant to the search string that can be retrieved using a corresponding persona identifier. Accordingly, active directory database 441 and mailbox 431 return at least a portion of the contact information stored in the contacts to persona aggregation system 425. In some cases, only a portion of the contact information stored in the contacts is returned. Which particular subset of the contact information is returned may be based on reply criteria specified by persona aggregation system 425.

Having assembled the appropriate contact information for each persona from active directory database 441 and mailbox 431, persona aggregation system 425 generates and transfers the personas to communication application 411. At least one of the personas includes information assembled from different contacts stored in both active directory database 441 and mailbox 431. In other words, at least one of the personas includes contact information from at least one contact stored in active directory database 441 and one contact stored in mailbox 431. Communication application 411 may then present the personas to user 402. In operational scenario 500, a communication is initiated using at least a portion of the contact information provided in one of the personas. For example, an email may be generated using an email address displayed in a persona or a voice or video call may be initiated using a phone number, service handle, or some other identifier provided in a persona.

Figure 6:
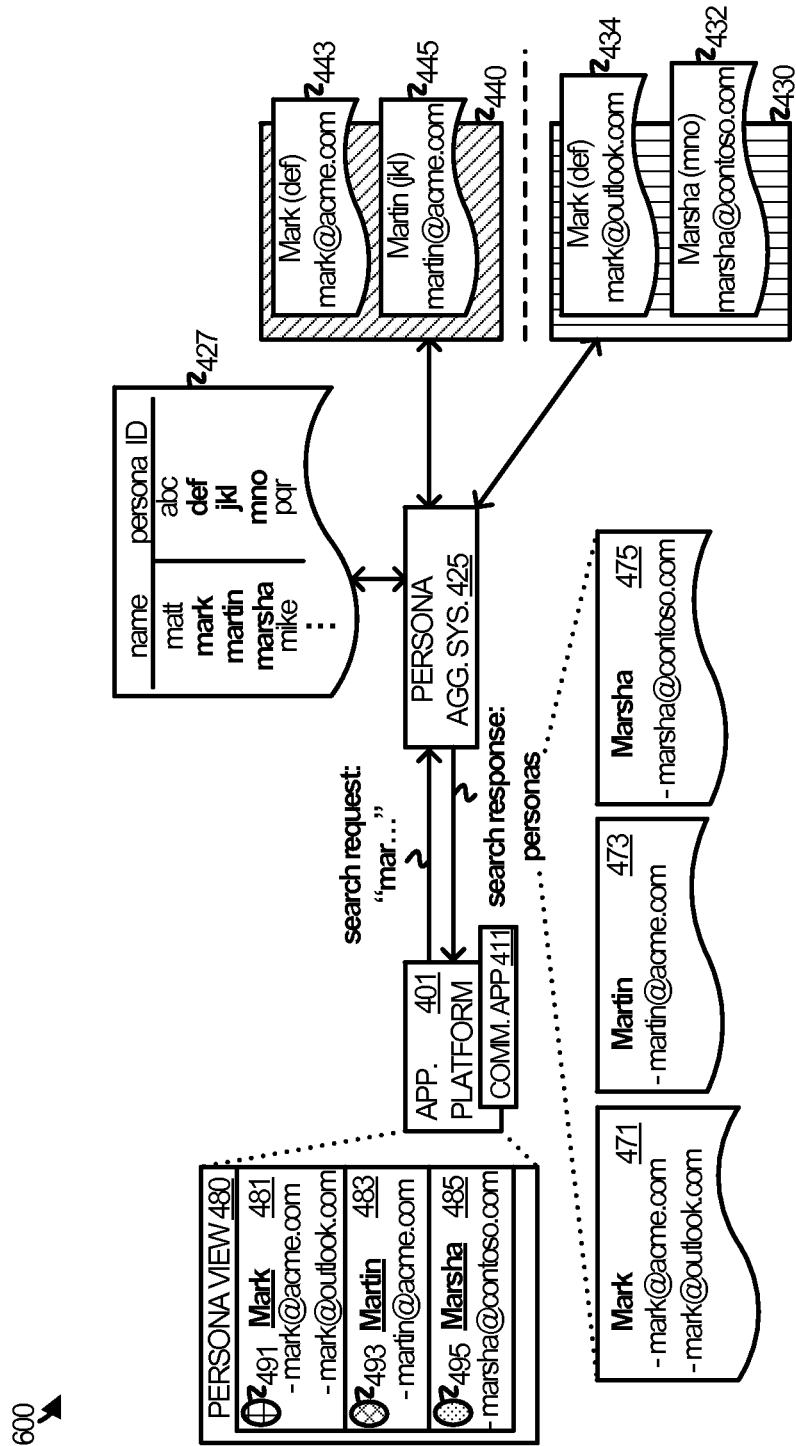
FIG. 6 illustrates a persona scenario with respect to a communication environment in an implementation.

FIG. 6 illustrates persona scenario 600 to explain in more detail some operations of persona aggregation system 425. In persona scenario 600, persona aggregation system 425 receives a search request initiated by communication application 411 and communicated by application platform 401. The search request includes a search string with which persona aggregation system 425 searches for relevant personas. In this scenario, the search string is three characters "mar." In other scenarios, the search request may include additional characters, additional words, or any other suitable combination or variation of alphanumeric characters. It may be assumed for exemplary purposes that the characters "mar" were entered by way of a user input, such as touch gestures, key board inputs, mouse clicks, or some other suitable user input. The user input may have occurred within the context of a variety of application functions, such as using a search tool, composing an email, or initiating a voice, video, or chat session.

In response to the search request, persona aggregation system 425 accesses persona table 427 to identify relevant personas and their corresponding persona identifiers (IDs). The personas in persona table 427 are identified by name, but may also be represented by an alias or some other suitable persona identity. The corresponding persona identifiers are used to query contact source 430 and contact source 440 for contact information stored within corresponding contacts. In this example, persona table 427 includes a list of personas, of which a subset is illustrated for exemplary purposes. Persona table 427 may be specifically associated with user 402, engaged with communication application 411, such that persona aggregation system 425 can maintain a list of personas specifically associated with user 402. Alternatively, persona table 427 may be associated with a group of users including user 402. In any case, persona table 427 may be associated with a restricted set of users such that identifying and generating relevant personas is feasible. Of the five personas illustrated in persona table 427, three may be considered to be relevant to the search string: "mark," "martin," and "marsha." Their corresponding persona identifiers are "def," "jkl," and "mno" respectively.

Having identified at least some relevant personas and their corresponding persona identifiers, persona aggregation system queries both contact source 430 and contact source 440 using the persona identifiers. Contact source 430 is illustrated as having at least two contacts associated with at least some of the persona identifiers included in the query or queries from persona aggregation system 425. Each of the contacts includes contact information that can be used. Persona aggregation system 425 generates and populates the personas with the contact information derived from the contact information in the contacts.

In particular, contact 434 and contact 432 in contact source 430 are associated with at least some of the identifiers, as well as contact 443 and contact 445 in contact source 440. Contact 434 may include several types of contact information, at least a subset of which can be used as contact information in a persona. Namely, contact 434 includes a name (Mark) and an email address (mark@outlook.com). Contact 432 may also include several types of contact information, at least a subset of which can also be used as contact information in a persona. The name associated with contact 432 is Marsha and the associated email address is marsha@contoso.com.

Contact 443 may also include several types of contact information, at least a subset of which can be used as contact information in a persona, including a name (Mark) and an email address (mark@acme.com). It may be appreciated that the persona identifier associated with contact 443—"def"—is the same as the persona identifier associated with contact 434. Indeed, the name associated with both contacts is the same, although the email addresses are different. However, rather than returning two contacts or even two personas to communication application 411, persona aggregation system 425 aggregates the contact information for contacts 443 and 434 into a single persona as discussed in more detail below. Contact 445 may also include several types of contact information, at least a subset of which can also be used as contact information in a persona, including the name "Martin" and the associated email address, martin@acme.com.

Having identified any relevant contacts, persona aggregation system 425 assembles a subset of the information from each of the relevant contacts into a corresponding persona. Persona 471 is generated and populated with information assembled from contacts 443 and 434; persona 473 is generated and populated with information assembled from contact 445; and persona 475 is generated and populated with information assembled from contact 432. Persona aggregation system 425, by way of communication between communication exchange system 421 and application platform 401, communicates personas 471, 473, and 475 to communication application 411. Communication application 411 can then present a persona view 480 of the personas provided in the search response.

Persona view 480 includes individual persona views 481, 483, and 485 corresponding to personas 471, 473, and 475 respectively. In addition to the contact information provided by each of the personas 471, 473, and 475, individual persona views 481, 483, and 485 may include other information or features, such as images 491, 493, and 495 corresponding to each person (Mark, Martin, and Marsha) represented by the personas. Images 491, 493, and 495 may be photos, avatars, or some other representation of a person associated with each persona. For example, image 491 may be a photo of Mark, and so on.

Persona view 480 may be presented within a variety of contexts associated with communication application 411. For example, communication application 411 may include a search tool with which user 402 may initiate people searches. The people searches initiated by user 402, such as by typing the beginning of a person's name, may trigger the search request described above, and may ultimately result in the search response presentation of persona view 480. Persona view 480 may include a variety of other features and functions, such as the ability to launch communication sessions directly from within an individual persona view.

In another example, the search request may be triggered by user inputs associated with other aspects of communication application 411, such as an address field within an email frame. In such a case, the input of a sufficient number of characters may trigger a search request, in response to which personas relevant to the characters may be displayed within or generally associated with the email frame, thereby allowing user 402 to select a particular persona with whom to communicate or particular information within a persona with which to communicate.

Selecting or otherwise providing an indication of interest with respect to a particular one of the individual persona views 481, 483, and 485 may trigger presentation of a more detailed view of the associated persona in some implementations. For example, selecting individual persona view 481 may trigger a persona request to persona aggregation system 425 to obtain additional contact information associated with persona 471, such as a phone number, service handle, or other type of contact information.

It may be appreciated that individual persona view 481 includes two email addresses. As noted above, contacts 443 and 434, with which individual persona view 481 is associated, may represent the same people. Thus, rather than display two separate contacts for the same person, persona view 480 includes just one individual persona view 481 for that person. Such a presentation accomplishes the presentation of contact information with less clutter and confusion that in previous solutions, allowing user 402 to interact with communication application 411 more intuitively and gracefully.

It may also be appreciated that contact source 430 may have a variety of contacts or contact information stored therein as is not restricted to just those contacts or types of contacts described herein. For example, while contact 434 and contact 432 include email addresses associated with the @outlook.com domain and the @contoso.com domain, contacts may be associated with other domains, other enterprises, other organizations, and the like. In addition, contact source 440 may also have a variety of contacts or contact information stored therein and is not restricted to just those contacts or types of contact information described herein. For example, while contact 443 and contact 445 include email addresses associated with the @acme.com domain, contacts may be associated with other domains, other enterprises, other organizations, and the like.

Figure 7:
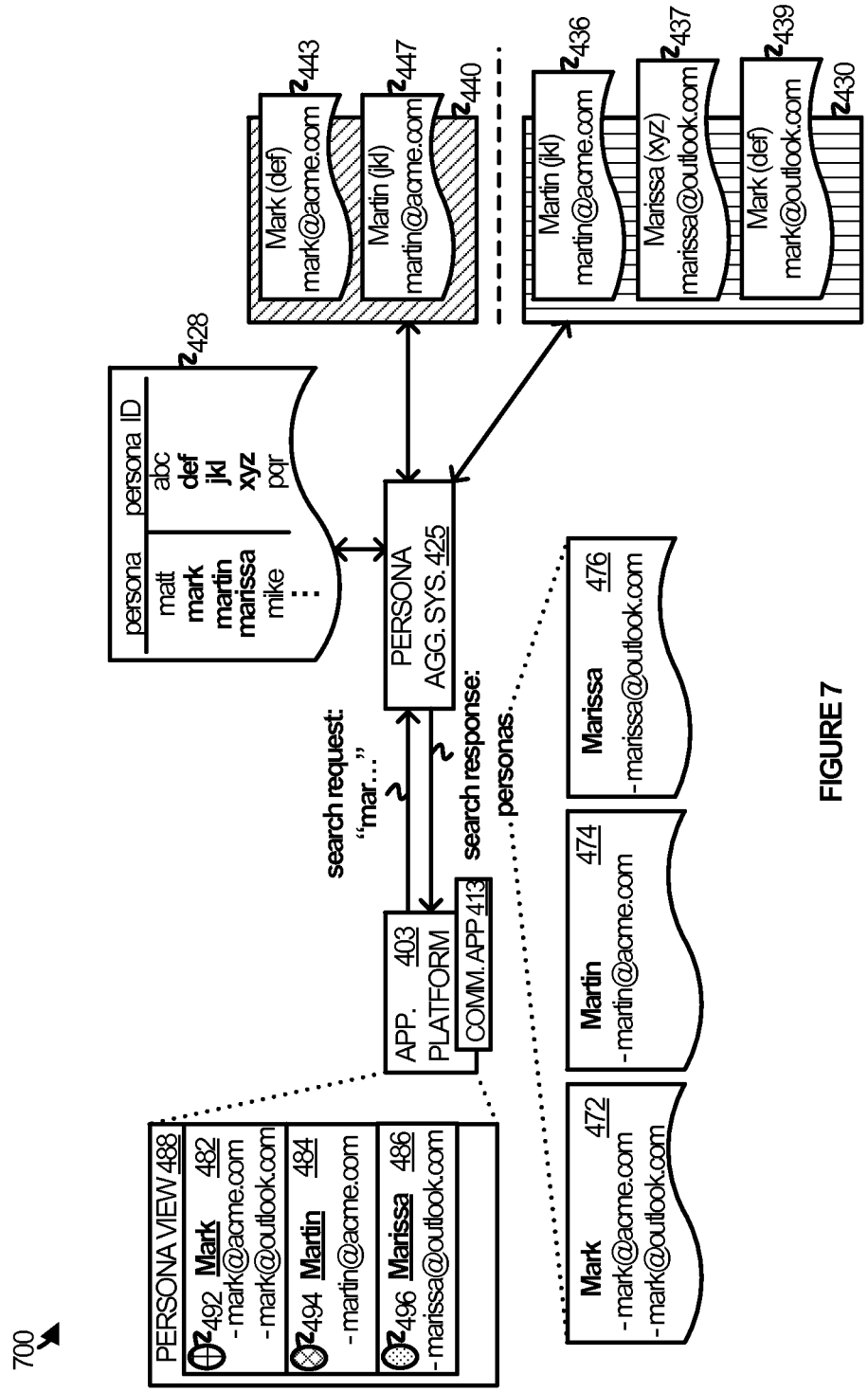
FIG. 7 illustrates a persona scenario with respect to a communication environment in an implementation.

In fact, there may very well be duplicate contacts or duplicate contact information in contact source 430 and contact source 440. FIG. 7 illustrates one such persona scenario 700 to illustrate how persona aggregation system 425 may account for this and other situations when providing a persona service.

In persona scenario 700, persona aggregation system 425 receives a search request initiated by communication application 413 and communicated by application platform 403. The search request includes a search string with which persona aggregation system 425 searches for relevant personas. In this scenario, the search string is again represented by three characters, "mar," for exemplary purposes. In other scenarios, the search request may include additional characters, additional words, or any other suitable combination or variation of alphanumeric characters. It may be assumed for exemplary purposes that the characters "mar" were entered by way of a user input, such as touch gestures, keyboard inputs, mouse clicks, or some other suitable user input. The user input may have occurred within the context of a variety of application functions, such as using a search tool, composing an email, or initiating a voice, video, or chat session.

In response to the search request, persona aggregation system 425 accesses persona table 428 to identify relevant persona names and their corresponding persona identifiers. The corresponding persona identifiers are used to query contact source 430 and contact source 440 for contact information stored within corresponding contacts. In this example, persona table 428 includes a list of persona names, of which a subset is illustrated for exemplary purposes. Persona table 428 may be specifically associated with user 404, engaged with communication application 413, such that persona aggregation system 425 can maintain a list of personas specifically associated with user 404. Alternatively, persona table 428 may be associated with a group of users including user 404. In any case, persona table 428 may be associated with a restricted set of users such that identifying and generating relevant personas is feasible. Of the five personas illustrated in persona table 428, three may be considered to be relevant to the search string: "mark," "martin," and "marissa." Their corresponding persona identifiers are "def," jkl," and "xyz" respectively. Note that the relevant personas identified with respect to persona scenario 600 differ from those identified with respect to persona scenario 600 discussed above in the context of FIG. 6. This is the case because persona scenario 700 involves user 404, whereas persona scenario 600 involved user 402. As such, the list of personas in persona table 427 differs from the list in persona table 428.

Having identified at least some relevant personas and their corresponding persona identifiers, persona aggregation system queries both contact source 430 and contact source 440 using the persona identifiers. Contact source 430 is illustrated as having at least three contacts associated with at least some of the persona identifiers included in the query or queries from persona aggregation system 425. Each of the contacts includes contact information that can be used. Persona aggregation system 425 generates and populates the personas with the contact information derived from the contact information in the contacts.

In particular, contact 436, contact 437, and contact 439 in contact source 430 are associated with at least some of the identifiers, as well as contact 443 and contact 447 in contact source 440. Contact 436, contact 437, and contact 439 may be stored in and retrieved from mailbox 433 associated with user 404, while contact 443 and contact 447 may be retrieved from active directory database 441. Contact 436 may include several types of contact information, at least a subset of which can be used as contact information in a persona. Namely, contact 436 includes a name (Martin) and an email address (martin@acme.com). Contact 437 may also include several types of contact information, at least a subset of which can also be used as contact information in a persona. The name associated with contact 437 is Marissa and the associated email address is marissa@outlook.com. Finally, contact 439 may also include several types of contact information, at least a subset of which can also be used as contact information in a persona. The name associated with contact 439 is Mark and the email address is mark@outlook.com Contact 443 may also include several types of contact information, at least a subset of which can be used as contact information in a persona, including a name (Mark) and an email address (mark@acme.com). Contact 445 may also include several types of contact information, at least a subset of which can also be used as contact information in a persona, including the name "Martin" and the associated email address, martin@acme.com.

It may be appreciated that the persona identifier associated with contact 447—"jkl"—is the same as the persona identifier associated with contact 436. Indeed, the name associated with both contacts is the same and the email addresses are the same. Rather than returning two contacts or even two personas to communication application 411, persona aggregation system 425 aggregates the contact information for contacts 447 and 436 into a single persona as discussed in more detail below. It may also be appreciated that the persona identifier associated with contact 443— "def"—is the same as the persona identifier associated with contact 439. Indeed, the name associated with both contacts is the same, although the email addresses are different. Rather than returning two contacts or even two personas to communication application 411, persona aggregation system 425 aggregates the contact information for contacts 443 and 439 into a single persona as discussed in more detail below.

Having identified any relevant contacts, persona aggregation system 425 assembles a subset of the information from each of the relevant contacts into a corresponding persona. Persona 472 is generated and populated with information assembled from contact 443 and contact 439; persona 474 is generated and populated with information assembled from contact 447 and possibly from contact 436, depending upon whether or not contact 436 includes any contact information from that found in contact 447; and persona 476 is generated and populated with information assembled from contact 437. Persona aggregation system 425, by way of communication between communication exchange system 421 and application platform 403, communicates personas 472, 474, and 476 to communication application 413. Communication application 413 can then present a persona view 488 of the personas provided in the search response.

Persona view 488 includes individual persona views 482, 484, and 486 corresponding to personas 472, 474, and 476 respectively. In addition to the contact information provided by each of the personas 472, 474, and 476, individual persona views 482, 484, and 486 may include other information or features, such as images 492, 494, and 496 corresponding to each person (Mark, Martin, and Marissa) represented by the personas. Images 492, 494, and 496 may be photos, avatars, or some other representation of a person associated with each persona. For example, image 492 may be a photo of Mark, and so on.

Persona view 488 may be presented within a variety of contexts associated with communication application 413. For example, communication application 413 may include a search tool with which user 404 may initiate people searches. The people searches initiated by user 404, such as by typing the beginning of a person's name, may trigger the search request described above, and may ultimately result in the search response presentation of persona view 488. Persona view 488 may include a variety of other features and functions, such as the ability to launch communication sessions directly from within an individual persona view.

In another example, the search request may be triggered by user inputs associated with other aspects of communication application 413, such as an address field within an email frame. In such a case, the input of a sufficient number of characters may trigger a search request, in response to which personas relevant to the characters may be displayed within or generally associated with the email frame, thereby allowing user 404 to select a particular persona with whom to communicate or particular information within a persona with which to communicate.

Selecting or otherwise providing an indication of interest with respect to a particular one of the individual persona views 482, 484, and 486 may trigger presentation of a more detailed view of the associated persona in some implementations. For example, selecting individual persona view 482 may trigger a persona request to persona aggregation system 425 to obtain additional contact information associated with persona 472, such as a phone number, service handle, or other type of contact information.

It may be appreciated that individual persona view 482 includes two email addresses. As noted above, contacts 443 and 439, with which individual persona view 482 is associated, may represent the same person. Thus, rather than display two separate contacts for the same person, persona view 488 includes just one individual persona view 482 for that person. It may also be appreciated that individual persona view 484 includes just one email address. As noted above, contacts 447 and 436, with which individual persona view 484 is associated, may represent the same person. Thus, rather than display two separate contacts for the same person, persona view 488 includes just one individual persona view 484 for that person. Such presentation accomplishes the presentation of contact information with less clutter and confusion that in previous solutions, allowing user 404 to interact with communication application 413 more intuitively and gracefully.

Figure 8:
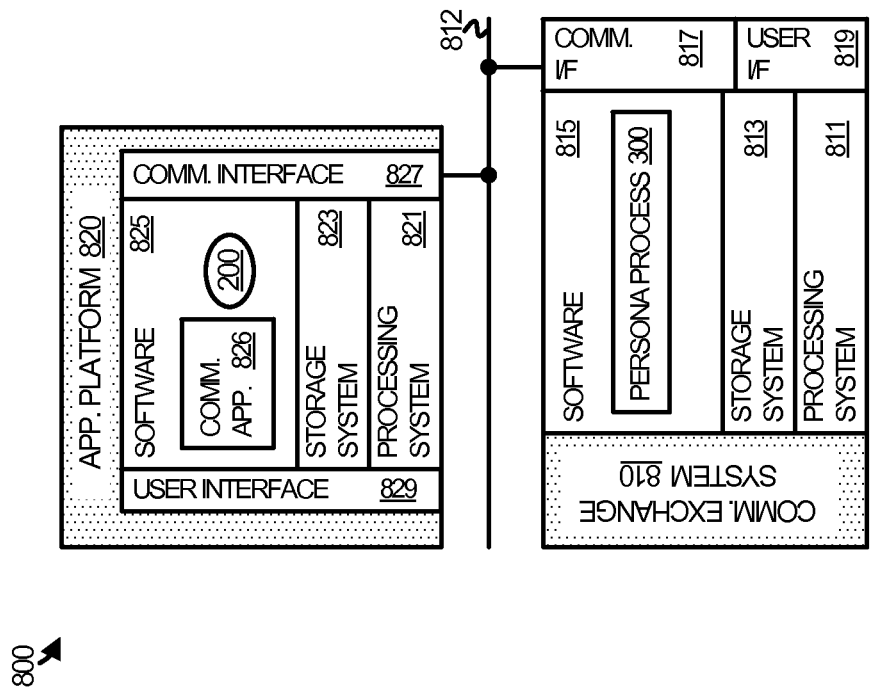
FIG. 8 illustrates a communication architecture in an implementation.

FIG. 8 illustrates communication architecture 800 suitable for implementing a communication exchange environment, such as communication exchange environments 100 and 400. Communication architecture 800 includes communication exchange system 810 in communication with application platform 820 over communication link 812.

Communication exchange system 810 may be representative of any system or collection of systems suitable for implementing communication exchange systems 103 and 421 and persona process 300 or variations thereof. Examples of communication exchange system 810 include server computers, cloud computing platforms, and virtual machines, as well as any other type of computing system, variation, or combination thereof.

Application platform 820 may be representative of any system or collection of systems suitable for implementing communication application 101, communication applications 411, 413, and 415 or any variations thereof. Implementing these applications may include local execution, streaming execution, or hosted execution of the applications and processes, or any combination or variation thereof. Examples of application platform 820 include mobile computing devices, desktop computers, cell phones, tablet computers, laptop computers, notebook computers, media devices, and gaming devices, as well as any other type of communicate system or device any combination or variation thereof. Examples of application platform 820 include server computers, cloud computing platforms, and virtual machines, as well as any other type of computing system, variation, or combination thereof.

In other words, in various implementation scenarios, communication application 101 and communication applications 411, 413, and 415 may be implemented as locally installed applications, or modules within other applications, running on a suitable application platform, such as a personal computer, mobile phone, or the like. In other scenarios, the applications may be hosted by a suitable application platform, such as an application server, with which another application, such as a personal computer, mobile phone, or the like, may interact. For example, communication application 101 and communication applications 411, 413, and 415 may be implemented as web-based applications hosted by an application server with which a user may interact by way of a web browser running on a local device operated by the user. It may be appreciated that communication application 101 and communication applications 411, 413, and 415 may be implemented using a wide variety of delivery mechanisms and techniques and a wide variety of communication systems, devices, and other types of computing equipment of which application platform 820 is intended to be representative.

Communication exchange system 810 includes processing system 811, storage system 813, software 815, communication interface 817, and user interface 819, which is optional. Processing system 811 is operatively coupled with storage system 813, communication interface 817, and user interface 819. Processing system 811 loads and executes software 815 from storage system 813. When executed by communication exchange system 810 in general, and processing system 811 in particular, software 815 directs communication exchange system 810 to operate as described herein for persona process 300 or variations thereof. Communication exchange system 810 may optionally include additional devices, features, or functionality not discussed herein.

Referring still to FIG. 8, processing system 811 may comprise a microprocessor and other circuitry that retrieves and executes software 815 from storage system 813. Processing system 811 may be implemented within a single processing device but may also be distributed across multiple processing devices or sub-systems that cooperate in executing program instructions. Examples of processing system 811 include general purpose central processing units, application specific processors, and logic devices, as well as any other type of processing device, combinations, or variations thereof.

Storage system 813 may comprise any computer readable storage media readable by processing system 811 and capable of storing software 815. Storage system 813 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations, storage system 813 may also include communication media over which software 815 may be communicated. Storage system 813 may be implemented as a single storage device but may also be implemented across multiple storage devices or sub-systems co-located or distributed relative to each other. Storage system 813 may comprise additional elements, such as a controller, capable of communicating with processing system 811.

Software 815 may be implemented in program instructions and among other functions may, when executed by communication exchange system 810 in general or processing system 811 in particular, direct communication exchange system 810 or processing system 811 to operate as described herein for persona process 300. Software 815 may include additional processes, programs, or components, such as operating system software or other application software. Software 815 may also comprise firmware or some other form of machine-readable processing instructions executable by processing system 811.

In general, software 815 may, when loaded into processing system 811 and executed, transform communication exchange system 810 overall from a general-purpose computing system into a special-purpose computing system customized to facilitate communication exchange environments as described herein for each implementation. Indeed, encoding software 815 on storage system 813 may transform the physical structure of storage system 813. The specific transformation of the physical structure may depend on various factors in different implementations of this description. Examples of such factors may include, but are not limited to the technology used to implement the storage media of storage system 813 and whether the computer-storage media are characterized as primary or secondary storage.

For example, if the computer-storage media are implemented as semiconductor-based memory, software 815 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that communication exchange system 810 is generally intended to represent a computing system with which software 815 is deployed and executed in order to implement persona process 300 (and variations thereof). However, communication exchange system 810 may also represent any computing system on which software 815 may be staged and from where software 815 may be distributed, transported, downloaded, or otherwise provided to yet another computing system for deployment and execution, or yet additional distribution.

Through the operation of communication exchange system 810 employing software 815, transformations may be performed. As an example, communication exchange system 810 could be considered transformed from one state to another when subject to persona process 300 or variations thereof. In a first state, communication exchange system 810 may receive a search request communicated by application platform 820. Responsive to the search request, personas are generated using information assembled from different contacts in different contact sources, thereby changing communication exchange system 810 to a second, different state. The personas are communicated in reply to application platform 820, thereby also changing application platform 820 to a different state.

Referring again to FIG. 8, communication interface 817 may include communication connections and devices that allow for communication between communication exchange system 810 and application platform 820 over communication link 812. Examples of connections and devices that together allow for inter-system communication may include network interface cards, antennas, power amplifiers, RF circuitry, transceivers, and other communication circuitry. To facilitate communication link 812, the connections and devices may communicate over communication media to exchange communications with other computing systems or networks of systems, such as metal, glass, air, or any other suitable communication media. The aforementioned communication media, network, connections, and devices are well known and need not be discussed at length here.

Application platform 820 includes processing system 821, storage system 823, software 825, communication interface 827, and user interface 829, which is optional. Processing system 821 is operatively coupled with storage system 823, communication interface 827, and user interface 829. Processing system 821 loads and executes software 825 from storage system 823. When executed by application platform 820 in general, and processing system 821 in particular, software 825 directs application platform 820 to operate as described herein for persona process 200 or variations thereof. Application platform 820 may optionally include additional devices, features, or functionality not discussed herein.

Referring still to FIG. 8, processing system 821 may comprise a microprocessor and other circuitry that retrieves and executes software 825 from storage system 823. Processing system 821 may be implemented within a single processing device but may also be distributed across multiple processing devices or sub-systems that cooperate in executing program instructions. Examples of processing system 821 include general purpose central processing units, application specific processors, and logic devices, as well as any other type of processing device, combinations, or variations thereof.

Storage system 823 may comprise any computer readable storage media readable by processing system 821 and capable of storing software 825. Storage system 823 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 823 may also include communication media over which software 825 may be communicated. Storage system 823 may be implemented as a single storage device but may also be implemented across multiple storage devices or sub-systems co-located or distributed relative to each other. Storage system 823 may comprise additional elements, such as a controller, capable of communicating with processing system 821.

Software 825 includes communication application 826 which is generally representative of communication application 101 and communication applications 411, 413, and 415. Software 825 may be implemented in program instructions and among other functions may, when executed by application platform 820 in general or processing system 821 in particular, direct application platform 820 or processing system 821 to operate as described herein for persona process 200. Software 825 may include additional processes, programs, or components, such as operating system software or other application software. Software 825 may also comprise firmware or some other form of machine-readable processing instructions executable by processing system 821.

In general, software 825 may, when loaded into processing system 821 and executed, transform application platform 820 overall from a general-purpose computing system into a special-purpose computing system customized to facilitate communication exchange environments as described herein for each implementation. Indeed, encoding software 825 on storage system 823 may transform the physical structure of storage system 823. The specific transformation of the physical structure may depend on various factors in different implementations of this description. Examples of such factors may include, but are not limited to the technology used to implement the storage media of storage system 823 and whether the computer-storage media are characterized as primary or secondary storage.

For example, if the computer-storage media are implemented as semiconductor-based memory, software 825 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that application platform 820 is generally intended to represent a computing system with which software 825 is deployed and executed in order to implement persona process 200 (and variations thereof). However, application platform 820 may also represent any computing system on which software 825 may be staged and from where software 825 may be distributed, transported, downloaded, or otherwise provided to yet another computing system for deployment and execution, or yet additional distribution.

Through the operation of application platform 820 employing software 825, transformations may be performed. As an example, application platform 820 could be considered transformed from one state to another when subject to persona process 200 or variations thereof. In a first state, application platform 820 may communicate a search request to communication exchange system 810. Responsive to a reply to the search request, which may include personas generated using information assembled from different contacts in different contact sources, application platform 820 may present the personas, thereby changing application platform 820 to a second, different state.

Referring again to FIG. 8, communication interface 827 may include communication connections and devices that allow for communication between application platform 820 and communication exchange system 810 over communication link 812. Examples of connections and devices that together allow for inter-system communication may include network interface cards, antennas, power amplifiers, RF circuitry, transceivers, and other communication circuitry. To facilitate communication link 812, the connections and devices may communicate over communication media to exchange communications with other computing systems or networks of systems, such as metal, glass, air, or any other suitable communication media. The aforementioned communication media, network, connections, and devices are well known and need not be discussed at length here.

User interface 829 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 829. In some cases, the input and output devices may be combined in a single device, such as a display capable of displaying images and receiving touch gestures. The aforementioned user input and output devices are well known in the art and need not be discussed at length here. User interface 829 may also include associated user interface software executable by processing system 821 in support of the various user input and output devices discussed above. Separately or in conjunction with each other and other hardware and software elements, the user interface software and devices may provide a graphical user interface, a natural user interface, or any other kind of user interface.

Communication link 812 may be any link over which communication exchange system 810 and application platform 820 may communicate. In some examples, communication link 812 may be representative of a network or collection of networks over which communication exchange system 810 and application platform 820 may communicate, such as an intranet, the Internet, a local area network, a wide area network, a wireless network, a wired network, or any combination or variation thereof. In other examples, communication exchange system 810 and application platform 820 may implemented in an integrated manner such that communication link 812 may be representative of an inter-system link, such as an internal communication bus. In any case, communication link 812 may include connections and devices that communication media, such as metal, glass, air, or any other suitable communication media. The aforementioned communication media, network, connections, and devices are well known and need not be discussed at length here.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
   one or more non-transitory computer readable storage media;
   one or more processors operatively coupled with the one or more computer readable storage media; and
   program instructions stored on the one or more computer readable storage media for facilitating a communication exchange environment that, when executed by the one or more processors, direct the apparatus to at least:
   in response to a search request comprising search criteria with which to search for relevant personas and reply criteria with which to populate the relevant personas, identify a plurality of persona identities based on the search criteria;
   in response to identifying the plurality of persona identities, identify, by querying a plurality of contact sources, a plurality of contacts associated with the plurality of persona identities;
   subsequent to a determination that two or more contacts of the plurality of contacts correspond to a same persona identity of the plurality of persona identities, generate aggregated contact information by aggregating the two or more contacts;
   generate a plurality of personas, each of the plurality of personas corresponding to a persona identity of the plurality of persona identities and comprising contact information assembled from at least a portion of the plurality of contacts, wherein a persona of the plurality of personas corresponding to the same persona identity comprises contact information assembled from at least the aggregated contact information; and
   based on the reply criteria, initiate a reply to the search request comprising the plurality of personas.

2. The apparatus of claim 1 wherein, for at least one persona of the plurality of personas, the portion of the plurality of contacts from which the contact information is assembled comprises a first contact identified from a first contact source of the plurality of contact sources and a second contact identified from a second contact source of the plurality of contact sources.

3. The apparatus of claim 2 wherein, for the at least one persona of the plurality of personas, the persona identity represents a person and the contact information comprises a first email address for the person assembled from the first contact and a second email address for the person assembled from the second contact.

4. The apparatus of claim 3 wherein to initiate the reply, the program instructions further direct the apparatus to communicate with a communication application that initiated the search request.

5. The apparatus of claim 1 wherein to initiate the reply based on the reply criteria, the program instructions further direct the apparatus to assemble the contact information from the portion of the plurality of contacts in accordance with the reply criteria.

6. The apparatus of claim 1 wherein the search criteria comprises a search string, the search string having been input while initiating a communication to identify a person associated with the communication.

7. The apparatus of claim 1 wherein the program instructions, to assemble the contact information from at least the portion of the plurality of contacts, further direct the apparatus to interface with a contacts folder to retrieve at least a portion of the contact information and interface with an organization directory service to retrieve at least another portion of the contact information.

8. The apparatus of claim 1 wherein the program instructions, to assemble the contact information from at least the portion of the plurality of contacts, further direct the apparatus to interface with a contacts folder to retrieve at least a portion of the contact information and interface with a social network service to retrieve at least another portion of the contact information.

9. A computer-implemented method of operating a communication exchange system to facilitate personas in a communication exchange environment, the method comprising:
    receiving a plurality of search requests comprising search criteria with which to search for relevant personas and reply criteria with which to populate the relevant personas, the search requests initiated by a plurality of application platforms in the communication exchange environment;
    in response to each of the plurality of search requests, identifying a plurality of persona identities;
    in response to identifying the plurality of persona identities, searching a plurality of different contact sources for any relevant contacts associated with the plurality of persona identities;
    subsequent to determining that two or more contacts of the relevant contacts correspond to a same persona identity of the plurality of persona identities, generating, based at least on aggregating contact information corresponding to the relevant contacts, a plurality of relevant personas, each of the plurality of relevant personas corresponding to a persona identity of the plurality of persona identities and comprising a portion of the contact information; and
    based on the reply criteria, returning the plurality of relevant personas to the plurality of application platforms in the communication exchange environment.

10. The method of claim 9 wherein each of the plurality of search requests comprises search criteria used when searching the plurality of different contact sources for the relevant contacts.

11. The method of claim 10 wherein each of the plurality of application platforms in the communication exchange environment includes a communication application and wherein the search criteria comprises a search string input to the communication application when initiating a communication.

12. The method of claim 9 wherein the reply criteria specifies with which portions of the relevant contacts to populate the relevant personas.

13. The method of claim 9 wherein the plurality of different contact sources comprises a contacts folder and an organization directory service.

14. The method of claim 9 wherein the plurality of different contact sources comprises a contacts folder and a social networking service.

15. A computer-implemented method for facilitating a communication exchange environment, the method comprising:
    in response to a search request comprising search criteria with which to search for relevant personas and reply criteria with which to populate the relevant personas, identifying a plurality of persona identities based on the search criteria;
    in response to identifying the plurality of persona identities, identifying in a plurality of contact sources comprising a plurality of contacts associated with the plurality of persona identities;
    subsequent to determining that two or more contacts of the plurality of contacts correspond to a same persona identity of the plurality of persona identities, generating, based at least on aggregating contact information corresponding to the plurality of contacts, a plurality of personas, each of the plurality of personas corresponding to a persona identity of the plurality of persona identities and comprising a portion of the contact information; and
    based on the reply criteria, initiating a reply to the search request comprising the plurality of personas.

16. The method of claim 15 wherein the search criteria comprises a search string, the search string input while initiating a communication to identify a person associated with the communication.

17. The method of claim 15 wherein the plurality of contact sources comprises a contacts folder and an organization directory service.

18. The method of claim 15 wherein the plurality of contact sources comprises a contacts folder and a social networking service.

19. The method of claim 15 wherein the reply criteria comprises instructions for assembling the contact information.

* * * * *